A. W. FRENCH.
PNEUMATIC METHOD OF VENTILATING COTTON SEED.
APPLICATION FILED SEPT. 7, 1917.
1,256,681.
Patented Feb. 19, 1918.
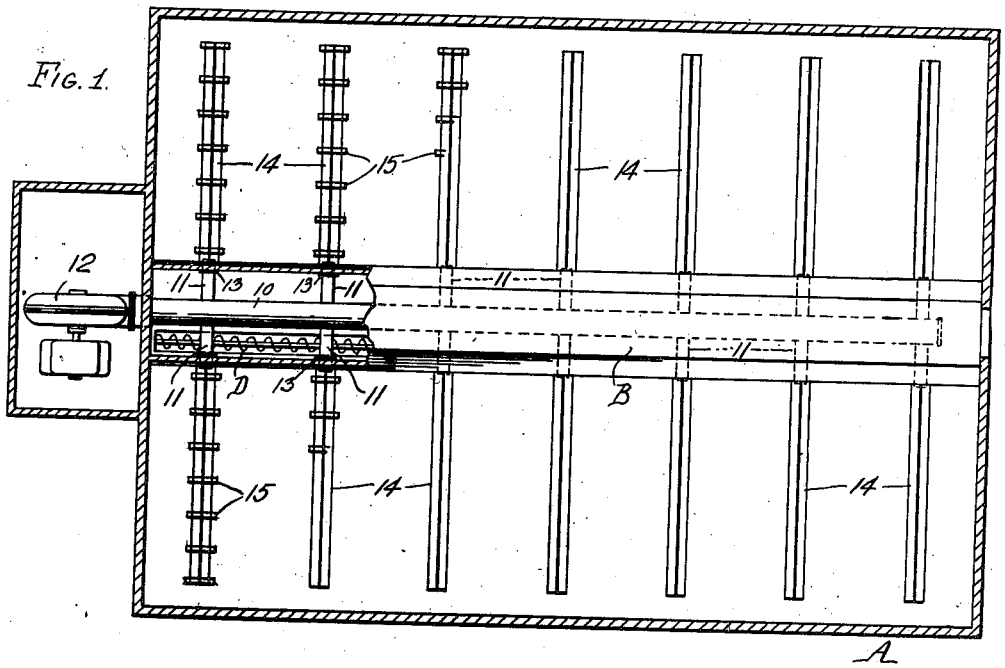
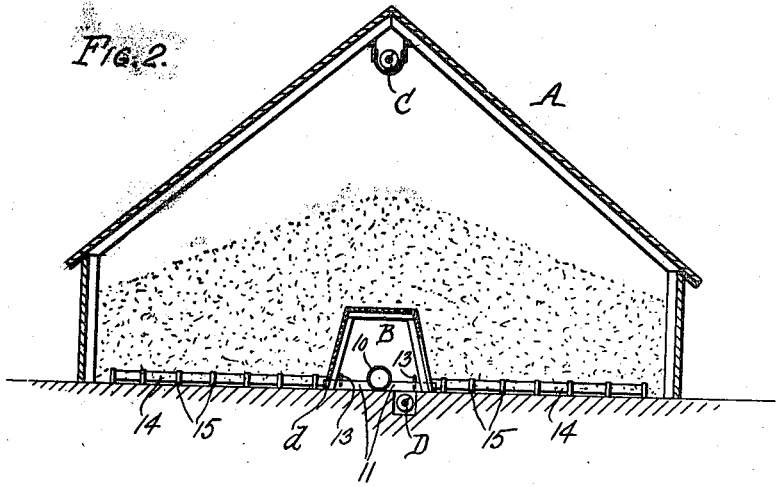
INVENTOR.
Alfred W. French.
By Wilhelm Parker.
ATTORNEYS.

# UNITED STATES PATENT OFFICE.

ALFRED W. FRENCH, OF PIQUA, OHIO.

PNEUMATIC METHOD OF VENTILATING COTTON-SEED.

1,256,681.  Specification of Letters Patent.  Patented Feb. 19, 1918.

Application filed September 7, 1917. Serial No. 190,199.

*To all whom it may concern:*

Be it known that I, ALFRED W. FRENCH, a citizen of the United States, residing at Piqua, in the county of Miami and State of Ohio, have invented a new and useful Improvement in Pneumatic Methods of Ventilating Cotton-Seed, of which the following is a specification.

This invention relates to a method for preventing cotton seed from heating and for driving the moisture from and cooling cotton seed which has become heated.

Vasts amounts of money are lost yearly by the cotton seed oil mills on account of the heating of cotton seed. Seed that has gone through a heat produces black oil, black meal and a grade of linters, the staple of which is so bad that its value is reduced probably fifty per cent. The monetary loss results in large measure from the difference in value between " prime " oil and " off " oil; between " prime " meal and " off " meal, due to the dark color of the meal; and between first grade and low grade linters. Seed which has been heated also seriously damages the machinery with which it comes into contact. This is probably due to an acid coming from the heated seed. And the fumes arising from the seed that has been heated are so disagreeable that it is difficult for the men to remain in the press rooms. While this enormous loss from the heating of cotton seed has been long recognized, the methods and apparatus heretofore devised for preventing the heating of the seed, or for cooling heated seed, have been found to be unsatisfactory or impractical for various reasons and have not been adopted to any very considerable extent. Machines which have been used for drying the seed are complicated, excessive in first cost, expensive to operate, take up much room and are not dependable in operation. As the seed is usually received by the mills in large quantities during comparatively short periods of time, the machines used for drying the seed to prevent after heating when in storage must be large and numerous in order to have the necessary capacity to handle the large quantities of seed. The seed must be kept in transit through the machine and if one car or lot of seed differs in moisture content from another lot, quick and intelligent action is needed to properly regulate the time of its proper treatment in the machine. That cannot well be done by such labor as is available in the average cotton-seed oil mills. Another method which has been tried is the treatment of the seed with a salt preparation. All of the seed is supposed to be treated with this preparation before being stored and the cost of the treatment is so great per ton of seed as to make the process prohibitive except in a few exceptional cases. Aside from the cost of the treatment, this method is open to serious objection for the reason that the seed treated with the preparation injures the machines through which it must pass. Another serious objection is that its application to seed already free from excess moisture causes deterioration and damages the seed and lint. Heretofore the cotton seed oil mills have had only the alternative of buying costly and not very dependable machines, or using the salt treatment method. In either case the cost is practically prohibitive.

The object of this invention is to provide a method by which cotton seed can be efficiently and economically treated while in storage, or lying in the usual seed house, and without necessitating the shoveling, handling or moving of the seed, for preventing it from heating and for cooling seed which has become heated; and particularly to provide a method that can be carried out by means of an apparatus which is of small first cost, can be readily installed in seed houses already built, is strong and durable, occupies the minimum space, can be operated at small expense and with little power to treat large quantities of seed and can be properly operated by the grade of laborers usual in cotton-seed oil mills.

In the accompanying drawings:

Figure 1 is a sectional plan view of a seed house provided with ventilating apparatus for carrying out the method.

Fig. 2 is a transverse sectional elevation thereof.

A represents a seed house of ordinary construction which is provided with the usual tunnel or passage B extending lengthwise through the lower portion of the house to afford access to different parts or chambers thereof; with a feed conveyer C extending lengthwise in the upper portion of the house for delivering the seed to the different parts or sections of the house; and with a discharge conveyer D in the floor of the tunnel into which the seed can be shoveled from any desired section of the house for discharging the seed. The side walls of the tunnel have the usual openings *d* along the lower portions thereof through which the seed can be shoveled, and are provided with suitable doors or removable sections which can be opened to allow the seed to be shoveled out and to permit one to pass into the seed chambers of the house.

10 represents a main air supply pipe or conduit, which, as shown, extends lengthwise of the seed house in the tunnel, and 11 represents a plurality of branch pipes or laterals leading from the main pipe into different portions of the seed house at opposite sides of the tunnel. Air is supplied to the main pipe or conduit under pressure as by means of a suitable fan or blower 12 connected with one end of the main pipe or conduit and driven by a motor or other suitable means. Suitable valves or gates 13 are provided in the branch pipes or laterals, or otherwise, for controlling the discharge of air from the branch pipes into the different parts of the house, all of the valves being arranged so that they can be readily adjusted, preferably without necessitating the attendant to enter the seed chambers of the house. Each branch pipe delivers air to an air distributer 14, which, as shown, is of inverted V-shape or cross shape and is supported on or close to the floor of the seed house by legs 15, or other means, which adequately support the distributer throughout its length and leave spaces under the bottom edges of the side walls of the distributer for the escape of air therefrom. The distributers are located substantially horizontally under or in the lower portion of the pile or piles of seed that rest on the floor of the seed house. Air distributing troughs or pipes of any other suitable construction adapted to be located in a similar manner under or in the lower portion of the mass of seed in the seed house, and to discharge the air into the seed from various points throughout the length of the distributers, can be used. The air distributers are made strong enough and are sufficiently supported throughout their length so as to sustain the weight of the body of seed bearing thereon, which is very considerable, owing to the angle of the repose of cotton seed. When the seed is first unloaded into the house the angle of repose may be about 45°, whereas after the seed has lain in the house and has become packed, the angle of repose may be approximately 90°, so that the weight on the distributers is very great. The distributers arranged as described greatly simplify the installation of the apparatus and reduce the cost thereof because the distributers can be made and supplied to the mills in the proper sizes and then placed in position by unskilled labor.

Air at a suitable temperature and under the required pressure is delivered by the fan through the main and branch pipes to the distributers, through which it is discharged into the seed. By appropriate adjustments of the valves 13 the air can be distributed more or less evenly throughout the body of seed in the seed house, or concentrated in one or several different portions of the seed as may be required by reason of the differences in condition of different portions of the seed. The air discharges laterally from the distributers and passes laterally and upwardly through the seed and is adapted to cool the seed and drive off the moisture from the same.

The seed varies greatly in moisture content at different times, and different lots of seed will vary greatly from each other. When the seed is moist and apt to heat it can be treated with the air as explained, to drive off the moisture and thus prevent the seed from heating and spoiling, and if the seed commences to heat or has become heated it can be cooled and saved by a similar treatment with the air.

I claim as my invention:

1. The herein described method of treating cotton seed, consisting in supplying a volume of air at multiple points at the base of a pile of cotton seed of substantial horizontal area to cause said air to distribute and pass laterally and upwardly through the mass of seed to prevent the seed from heating and to cool any seed which may have become heated.

2. The herein described method of treating cotton seed, consisting in supplying air at multiple points in the base of a pile of cotton seed of substantial horizontal area, the air being discharged under pressure sufficient to cause the same to distribute and permeate through the mass of seed to prevent the seed from heating and to cool any seed which may have become heated.

3. The herein described method of treating cotton seed, consisting in discharging air under pressure at multiple points at the base of a pile of cotton seed of substantial horizontal area resting on a substantially horizontal supporting surface, to cause said air to distribute and pass laterally and upwardly through the mass of seed to prevent the seed from heating and to cool any seed which may have become heated.

4. The herein described method of treating cotton seed, consisting in discharging air under pressure at multiple points at the base of a pile of cotton seed of substantial horizontal area in a chamber having an extended substantially horizontal seed supporting surface, to cause said air to distribute and permeate through the mass of seed to prevent the seed from heating and to cool any seed which may have become heated, and providing access to the seed at various points at the base of said pile.

5. The herein described method of treating cotton seed, consisting in discharging air under pressure at multiple points at the base of a pile of cotton seed of substantial horizontal area resting on a substantially horizontal supporting surface, to cause said air to distribute and pass laterally and upwardly through the mass of seed to prevent the seed from heating and to cool any seed which may have become heated, and regulating the supply so as to distribute the air throughout the mass of seed or to concentrate the discharge in a particular portion or portions of the mass depending upon the cindition of different portions of the seed.

Witness my hand, this 1st day of September, 1917.

ALFRED W. FRENCH.

Witnesses:
C. B. UPTON,
WEALTHY F. ROWE.